United States Patent Office 3,404,243
Patented Oct. 1, 1968

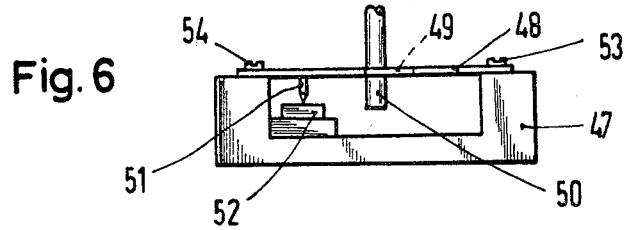
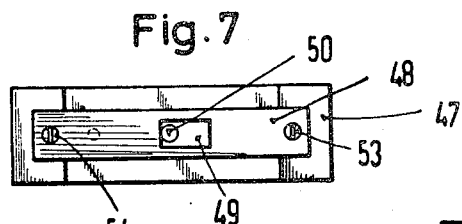
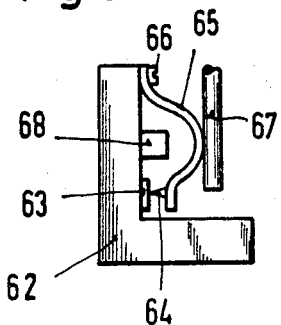
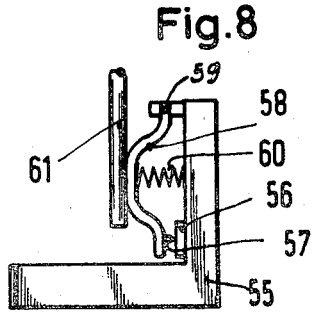
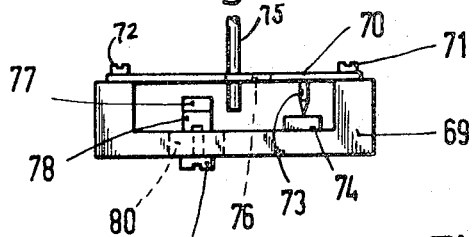
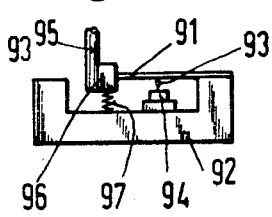
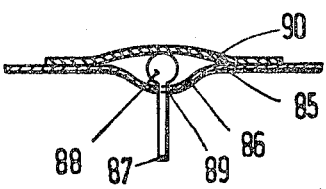

3,404,243
OVERLOAD PROTECTION OF PRESSURE
SENSITIVE TRANSDUCER
Friedrich Krieger, Gilching, and Adolf Pascher, Bad-Heilbrunn, Germany, assignors to Siemens Aktiengesellschaft, Munich, Germany
Filed Aug. 12, 1965, Ser. No. 479,254
Claims priority, application Germany, Sept. 9, 1964,
S 93,043
25 Claims. (Cl. 179—110)

This invention concerns crystal transducers, for example microphones, provided with a semiconductor containing a PN junction and upon which a pressure is exerted by a control member such as a diaphragm, through a pressure element, such as a sapphire point.

Transducers of this type have the disadvantage that they are extremely sensitive to overloads which can occur, for example, if the transducer is exposed to a blow or a jolt. If the transducer is a microphone, a clapping sound or the like may cause a strain such as to make the pressure element exert such pressure upon the semiconductor that the latter is damaged or even destroyed. A further disadvantage of known types of such transducers is that permanent deformations of the control member which result from gradual changes therein as by thermal influence, but also as by sudden overloads which do not damage the semiconductor, nevertheless lead to changes in the properties of the transducers. This occurs because the pressure which the control element exerts upon the semiconductor in the rest or static position of the transducer, is changed.

The object of the present invention is to avoid the above-mentioned and other disadvantages of known crystal transducers.

These and other objects of the invention are achieved by use of a transmitting member which is controlled by the control member and which has at least one of its sides etxending essentially in the direction of motion thereof, but which is maintained in positive engagement with a resilient movable holding member which carries the pressure element, until the force exerted by the control member on the transmitting member exceeds a certain predetermined magnitude. When that condition occurs, the transmitting member is no longer maintained in positive force-transmitting engagement with the holding member carrying the pressure element, so that no further force of the pressure element on the semiconductor is exerted.

More particularly, when a sudden overload occurs such as through a blow, a jolt or the like exerted on the control member, the transmitting member is driven with such force that the direct engagement between the transmitting member and the holding member is eliminated. This elimination occurs by reason of the fact that at least one of the sides of the transmitting member extends in the direction of motion of that member, so that the force-transmitting member can slide by the holding member when an excessive acceleration occurs. It has been found with the construction of the invention that, even in the case of exceedingly strong deflections of the control member, no damaging effect on the semiconductor is any longer observed. The force-transmitting element also slides beyond the holding element for the pressure member even when the excessively large forces acting on the transmitting member are caused by gradual changes in the control member. Thus, the transducer formed in accordance with the invention is able to cope with all burdens operating upon the control element in the practical operation of a transducer, without rendering the transducer useless or causing destruction thereof.

The coupling between the holding member which carries the pressure element and the force-transmitting element can be formed in simple manner with a direct engagement between the transmitting member and the holding member. However, it is also possible to arrange one or more intermediate members between the transmitting member and the holding member, for example, if it is desired to obtain a special proportionality between the movement of the transmitting member and the holding member.

The movable holding member can also be formed of spring material, at least in part, as for example as a leaf spring affixed to a mounting member either at one end or at both ends thereof. Nevertheless, it is possible that the holding member which carries the pressure element may be formed of rigid material and be positioned in movable fashion such as to be pivotable under the influence of one or several spring elements.

It is also possible that the position of the holding member with respect to the transmitting member be different. Thus, it is possible to place the holding member either essentially perpendicular to the direction of motion of the transmitting member, or essentially parallel to that direction of motion. Accordingly, the construction of a transducer in accordance with the invention can be varied substantially in adaptation to the conditions of use predicted for the particular transducer.

If the transmitting element of the invention is directly engaged with the holding element, the point of engagement may nevertheless be varied. For example, the transmitting element can contact a portion of the holding member adjacent one of the ends thereof, such as by pressing against the free end of a leaf spring which serves as a holding member and which has one end thereof attached to a suitable support. However, the transmitting member may also be pressed against a center portion of the holding member, as in a construction of the holding member as a leaf spring having cutout portions defining a central slot within which the transmitting member fits. Corresponding points of attachment can also be provided if the holding member is rigid, but nevertheless pivotally supported.

If the holding member is positioned essentially in parallel with the direction of motion of the transmitting member, the holding member may be provided with an indentation or boss in the portion of the transmitting member which engages the holding member. This indentation may be so shaped that the size of the engagement area between the holding member and the transmitting member can be varied in simple fashion.

An especially advantageous form of the invention employs a passage which is broken through the holding member and within which the transmitting member fits. Through this passage good guidance of the transmitting member is achieved.

The force engagement between the transmitting member and the holding member can be through a spring. The spring force can be introduced through the self-resiliency of a holding member which at least partially consists of a spring material, as well as through the self-resiliency of a transmitting member which at least partially is formed of spring material. Additionally, the spring force for connection between the transmitting member and the holding member can be supplied through an additional spring element.

As indicated above, one of the members may be of spring material and be supplied with bent-out portions providing spring-like flaps which engage the sides of the transmitting member. Also, it may be desirable in certain cases to adjust the spring force affecting the force connection between the transmitting member and the holding member, such as by the use of an adjusting screw by which the static force of an additional spring element is changed.

In a particularly advantageous construction of the transducer of the invention, the force connection between the transmitting member and the holding member may be effected through the use of magnetic force. That is, the static force exerted by the transmitting member upon the pressure member may be achieved through the use of magnetic elements. In fact, an electromagnet, as well as one or more permanent magnets may be used for this purpose. A simple construction employing this principle has the transmitting member in direct contact with the holding member, one of the two members being formed at least in part of permanent magnetic material, and the other being formed at least in part of ferromagnetic material. However, it is also possible that both members be formed at least in part of permanent magnetic material.

It will be evident that an additional magnet not forming part of either the transmitting member or the holding member could also be used. Thus the transmitting member could be formed either wholly or partially of ferromagnetic material and a separate permanent magnet could be arranged in such fashion that the transmitting member is in the field of the separate magnet, and is urged toward the holding member. In such case, of course the holding member need not have any ferromagnetic material therein and can be selected only with regard to its spring properties.

In order to control the force of engagement between the transmitting element and the holding element, means can be provided by which the magnetic power affecting this force is changed. Thus, for example, it is possible to move the permanent magnet with respect to the transmitting member, or to provide it with an adjustable shunt.

In order to select the dimensions of the area of engagement between the transmitting member and the holding member, independently of the form of the holding member itself, it is possible to provide a movable intermediate spring member between the two elements. If this intermediate member is of permanent magnetic material and both the holding member and the transmitting member are formed at least in part of ferromagnetic material, then a force engagement between the holding member and the transmitting member is established.

The transmitting member can be attached directly to the control member, such as to the diaphragm of a transducer, however, it is also possible to attach the transmitting member to an intermediate member to which the motion of the control member is transmitted.

In order that extensive deformations of the control member may not adversely affect the transmitting mechanism, the transmitting member may be formed or fixed in such fashion to the member supporting it, such as the control member, that while it is rigidly connected for motion in the direction of proper motion, it is nevertheless movable in a perpendicular direction with respect to the direction of motion. A ball-joint-like engagement may be provided for this purpose.

A particularly simple arrangement of the transducer of the invention is achieved when the holding member, the pressure element, the semiconductor, and even any arrangement provided to establish a force connection between the transmitting member and the holding member (such as a spring or permanent magnet), are all formed into one unit which is insertable into the transducer. Then, the required adjustments can be made to the insert, either in position or upon removal from the insert without disturbance to the transducer itself. Furthermore, the insert can be provided with a spring carrier which supports the transmitting member. Then the insert can be inserted into the transducer in such a way that the carrier is coupled with the control member for example by simple pressing against the control member.

The invention will now be more fully described in conjunction with drawings showing operative embodiments thereof.

In the drawings:

FIG. 6 is an elevational view of a further form of insert for use in the microphone of the form of FIG. 2;

FIG. 7 is a plan view of the apparatus of FIG. 6;

FIG. 8 is an elevational view of another form of insert for the apparatus of the invention;

FIG. 9 is an elevational view of a modification of the apparatus of FIG. 8 in which the permanent magnet is a separate element;

FIG. 10 is an elevational view of a modified form of insert in which the holding element is supported at opposite ends as in FIG. 6, but in which a separate permanent magnet is employed;

FIG. 11 is an elevational view of a further modified form of insert in which an intermediate member is arranged between the transmitting member and the holding member; and FIG. 12 is a partly sectional view of a joint construction between the control element and the transmitting element.

Figure 1:
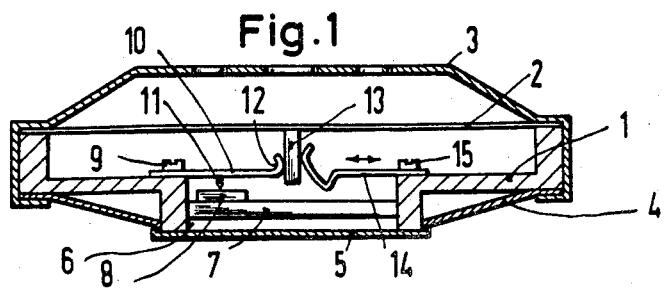
FIG. 1 is a vertical sectional view of a microphone constructed in accordance with the invention.

The crystal transducer shown in FIG. 1 includes a support member 1 carrying a vibratory diaphragm 2, and a protective casing formed by sheet metal enclosure members 3, 4 and 5. The support member has passage 6 into which an insert 7 is introduced, which insert carries a PN junction semiconductor 8. The mounting member 1 carries a leaf spring 10 affixed thereto at one end thereof by a screw 9, with a sapphire point 11 affixed to the lower side of the leaf spring 10 and in contact with the semiconductor 8. At its free end, the leaf spring 10 is provided with a hook portion 12 against which the transmitting member 13 is pressed, that member being supported by the diaphragm 2. As a result, motions of the diaphragm 2 are translated into motions of the transmitting member 13.

The spike-like transmitting member 13 is pressed against the hook portion 12 of spring 10 by a leaf spring 14 attached to the mounting member 1 by a screw 15. As indicated by the arrows in the figure, the mounting of spring 14 is preferably such that it can be adjusted toward and away from the transmitting member 13 to adjust the pressure with which the transmitting member is pressed against the spring 10.

Figure 2:
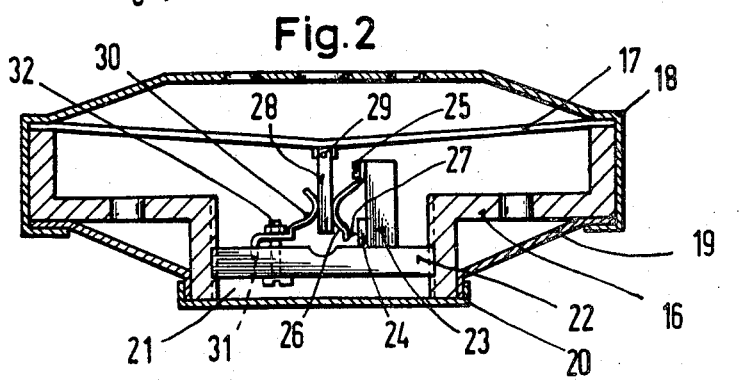
FIG. 2 is a vertical sectional view of another embodiment of the microphone of the invention showing a screwed-in insert carrying some of the active elements of the apparatus.

A modified embodiment of the invention is shown in FIG. 2 in which the mounting member is identified by the numeral 16 and supports the membrane 17, the combination thereof being provided with a protective housing formed by casing metal members 18, 19 and 20. The mounting member 16 has a cylindrical opening 21 into which is threaded an insert member 22. The insert carries an attachment 23 upon which a semiconductor 24 is fixed. The attachment 23 also carries a leaf spring fixed thereto by a screw 25, the leaf spring carrying at its free end a sapphire point 27 which is pressed against the semiconductor 24.

A force transmitting member 28 is attached to the diaphragm 17 by means of a joint 29 and is pressed against the leaf spring 26 by a complementary leaf spring 30 attached to the insert 22 by a screw and nut mounting 32. The end or attachment 31 of the spring member 30 fits into an indentation in insert 22 which is so shaped that the pressure exerted by the spring 30 on the transmitting member 28 can be changed by adjustment of the screw 32.

Removal of the cap member 20 of the casing allows access to the adjustment screw 32 for the purpose of control of the force exerted on the transmitting member 28.

Figure 3:
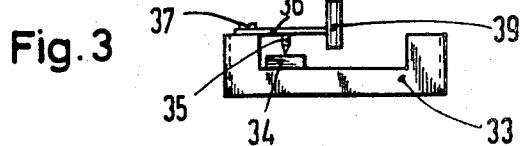
FIG. 3 is an elevational view of another form of insert adapted for use in the microphone of FIG. 2.

FIG. 3 shows a modified insert of a type suitable for use in the transducer of FIG. 2. The insert 33 of this figure carries a semiconductor 34 against which a sapphire point 35 is pressed. The sapphire point is carried by a leaf spring 36 which is supported at one end by the screw 37 attaching the spring to the insert 33. A force transmitting member 38 is attached to the free end of the spring and is formed in its lowermost portion as a permanent magnet 39. The spring 36 is of ferromagnetic material so that the transmitting member is pressed against the spring 36 by magnetic attraction.

Figure 4:
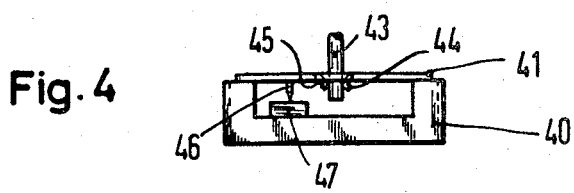
FIG. 4 is an elevational view of a further form of insert designed for the microphone of FIG. 2.
Figure 5:
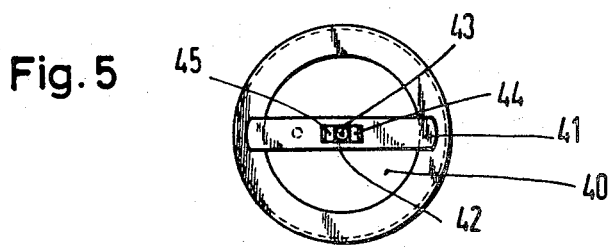
FIG. 5 is a plan view of the insert of FIG. 4.

Another embodiment of the insert is shown in FIGS. 4 and 5 and includes an insert 40 designed for insertion into the transducer of FIG. 2. This insert supports a leaf spring 41 which is attached at both ends to the insert. The leaf spring is provided with a central passage 42 through which extends the transmitting element 43, by which the motions of a diaphragm are transmitted. The spring member 41 has a pair of flap extension portions 44 and 45 which are pressed out of the spring and extend as bent ends into contact with the transmitting member 43. The spring also carries a sapphire point 46 which contacts the semiconductor 47.

Referring now to FIGS. 6 and 7, the insert 47 of those figures carries a spring 48 attached at both of its opposite ends to the insert, and provided with a passage 49 extending therethrough. A stud-like transmitting member 50, which is formed in its lower portion of permanent magnetic material, extends through the passage 49. The spring 48 is formed of ferromagnetic material, so that the transmitting member is pressed by a magnetic attraction against one end of the passage 49.

Movements of the spring 48 caused by the transmitting member, are transmitted into motions of a sapphire point 51 which is pressed against a semiconductor 52. The spring 48 is attached to the insert 47 by screws 53 and 54.

Referring next to FIG. 8, the insert 55 of that figure supports a semiconductor member 56 against which a sapphire point 57 is pressed. This sapphire point is mounted on a rigid holding member 58 which is pivotally supported by a pivotal mounting 59 from the upper end of the insert 55. A spring 60 biases the holding member 58 to the left of FIG. 8, but the transmitting member 61 is of permanent magnetic material and the holding member 58 of ferromagnetic material, so that the diaphragm force-transmitting member 61 is pressed against the holding member.

In the modification of FIG. 9, the holding member 65 is of spring material, and the force-transmitting member 67 is of ferromagnetic material, rather than permanent magnetic material as in the apparatus of FIG. 8. The permanent magnet of the apparatus of FIG. 9 is a separate element 68 mounted on the insert 62. The result of this construction is that the transmitting element 67 is pressed against the holding member 65, so that the sapphire point 64 is engaged with the semiconductor 63.

A further embodiment of the invention is shown in FIG. 10 in which the carrier or insert member 69 carries a leaf spring 70 which is attached to the carrier by screws 71 and 72 at opposite ends thereof. The appropriate pressure element, such as a sapphire point 73, is carried by the spring 70 and engages the semiconductor member 74. The force transmitting member 75 (provided as before to transmit motions of the diaphragm to the semiconductor), extends through a passage 76 in the spring 70. The lower portion of the transmitting member is preferably of ferromagnetic material, and is located in the field of a permanent magnet 77 mounted on the carrier 69 by means of a magnet carrier 78.

The mounting screw 79 for the permanent magnet carrier 78 extends through a longitudinal slot 80 in the insert carrier 69, so that the position of the permanent magnet with respect to the transmitting member 75 may be varied, to regulate the force which the sapphire point 73 exerts on the semiconductor member 74.

The insert of FIG. 11 employs an intermediate member arranged between the holding member for the pressure element, and the transmitting member which is controlled by the diaphragm. The holding member is positioned on a carrier 92 and is a spring 91 affixed at one end to the carrier. The spring 91 is of ferromagnetic material and a permanent magnet 96 is arranged between that spring and the force transmitting member 95, which is also of ferromagnetic material. The permanent magnet 96 is supported from the carrier 92 by a suitable spring diagrammatically shown at 97. The force attracting the transmitting element 95 and the holding member 91 is thereby produced through the intermediate permanent magnet 96.

In the operative embodiments described hereinabove, the semiconductor and the holding member are arranged on an insert which can be inserted into a crystal transducer. However, it should be realized that the invention can be employed with omission of such inserts and with the holding member and semiconductor, as well as other parts of the mechanism, being a part of the transducer casing, rather than a part of an insert for that casing.

FIG. 12 shows another arrangement for fastening the force transmitting member to the diaphragm or control member. In that figure is shown in section a diaphragm 85 provided with a central passage formed between two members attached to one another, the central passage being identified at 86 and having a central opening into the passage identified at 89. The force transmitting member 87 extends through this opening and is provided with a cap of spherical shape 88 which is larger than the opening 89. The upper member forming the passage 86 is a leaf spring 90 which is attached to the diaphragm 85, and which holds the cap 88 of the transmitting member 87 within the passage. This construction of course is of a ball joint.

It will be appreciated that many other changes could be made in the various forms of the invention shown in the drawings hereof. Accordingly, the invention is not to be considered limited to the particular embodiments disclosed herein, but rather only by the scope of the appended claims.

We claim:

1. In a crystal transducer, such as a microphone, having a semiconductor containing a PN junction upon which pressure is exerted by movements of a control member, through a pressure exerting element engaged with the semiconductor, the improvement comprising a transmitting member connected to the control member for control thereby and having at least one side which extends essentially in the direction of motion thereof in response to motion of the control member, and a resilient movable holding member carrying said pressure element, said transmitting member being in force-transmitting engagement with the holding member only so long as the force exerted on the transmitting member by the control member does not exceed a predetermined magnitude.

2. The apparatus of claim 1 in which the transmitting member directly engages the holding member.

3. The apparatus of claim 1 in which an intermediate member is arranged between the transmitting member and the holding member to prevent direct engagement therebetween.

4. The apparatus of claim 1 in which the holding member which carries the pressure element is formed at least in part of spring material.

5. The apparatus of claim 1 in which the holding member which carries the pressure element is formed of rigid material but is pivotally mounted and has a spring element engaged therewith to control its static position.

6. The apparatus of claim 1 in which the holding member extends essentially perpendicularly to the direction of motion of the transmitting member.

7. The apparatus of claim 1 in which the holding member extends essentially parallel to the direction of motion of the transmitting member.

8. The apparatus of claim 1 in which the holding member has a passage extending therethrough and into which the transmitting member projects.

9. The apparatus of claim 1 in which the force connection between the transmitting member and the holding member is effected by spring force.

10. The apparatus of claim 9 in which the holding member is at least partially of spring material.

11. The apparatus of claim 9 in which the transmitting member is at least partially of spring material.

12. The apparatus of claim 10 in which the holding member is provided with spring flaps bent out from the main body of the holding member and forming a passage extending therethrough, the transmitting member extending through such passage and in contact with the spring flaps, such spring flaps forming the force connection between the transmitting member and the holding member.

13. The apparatus of claim 9 including means for adjusting the spring force effecting the force connection between the transmitting member and the holding member.

14. The apparatus of claim 1 in which the force connection between the transmitting member and holding member is effected through magnetic force.

15. The apparatus of claim 1 in which one of the holding member and the transmitting member is formed at least partially of permanent magnetic material and the other member is formed at least partially of ferromagnetic material.

16. The apparatus of claim 15 in which both the transmitting member and the holding member are formed at least partially of permanent magnetic material.

17. The apparatus of claim 15 in which the transmitting member is formed at least partially of permanent magnetic material and a magnet is mounted adjacent the transmitting member in position such that it urges the transmitting member into engagement with the holding member.

18. The apparatus of claim 15 in which means are provided for adjusting the magnetic force effecting the force connection between the transmitting member and the holding member.

19. The apparatus of claim 18 in which a separate permanent magnet is employed and is slidably fixed in position in relation to the transmitting member.

20. The apparatus of claim 1 in which a resiliently mounted intermediate member is arranged between the holding member and the transmitting member.

21. The apparatus of claim 20 in which the holding member and the transmitting member are formed at least in part of ferromagnetic material and the intermediate member is a permanent magnet.

22. The apparatus of claim 1 in which the transmitting member is so connected to the control member that a rigid connection therebetween in the direction of movement of the control member is achieved but the transmitting member is movable in the perpendicular direction to the said direction of movement, with respect to the control member.

23. The apparatus of claim 22 in which the joint between the transmitting member and the control member is a ball joint.

24. The apparatus of claim 1 including an insert for the transducer which carries the holding element, the pressure element, and the semiconductor, the insert being adapted to be engaged into the transducer so that the transmitting member of the transducer engages the holding member.

25. The apparatus of claim 24 in which the insert carries a spring member which in turn carries the transmitting member.

No references cited.

KATHLEEN H. CLAFFY, *Primary Examiner.*

A. A. McGILL, *Assistant Examiner.*